US011501313B2

(12) United States Patent
Sosna et al.

(10) Patent No.: US 11,501,313 B2
(45) Date of Patent: *Nov. 15, 2022

(54) SYSTEM AND METHOD FOR DISPLAYING DATA FROM A STORAGE

(71) Applicant: Veeva Systems Inc., Pleasanton, CA (US)

(72) Inventors: Arno Sosna, Pleasanton, CA (US); Nicholas Chrzan, Sugar Hill, GA (US)

(73) Assignee: Veeva Systems Inc., Pleasanton, CA (US)

( * ) Notice: Subject to any disclaimer, the term of this patent is extended or adjusted under 35 U.S.C. 154(b) by 343 days.

This patent is subject to a terminal disclaimer.

(21) Appl. No.: 15/791,187

(22) Filed: Oct. 23, 2017

(65) Prior Publication Data

US 2019/0122225 A1  Apr. 25, 2019

(51) Int. Cl.
| G06F 17/00 | (2019.01) |
| G06Q 30/00 | (2012.01) |
| G06F 16/248 | (2019.01) |
| G06F 16/958 | (2019.01) |
| G06F 16/23 | (2019.01) |
| G06F 40/143 | (2020.01) |

(52) U.S. Cl.
CPC ....... G06Q 30/016 (2013.01); G06F 16/2379 (2019.01); G06F 16/248 (2019.01); G06F 16/986 (2019.01); G06F 40/143 (2020.01)

(58) Field of Classification Search
None
See application file for complete search history.

(56) References Cited

U.S. PATENT DOCUMENTS

| 8,719,222 B2* | 5/2014 | Richardson ....... G06F 17/30206 707/622 |
| 2006/0155720 A1* | 7/2006 | Feinberg ............. G06F 17/3056 |
| 2008/0040371 A1* | 2/2008 | Bayyapu ............... G06F 9/4443 |
| 2008/0162532 A1* | 7/2008 | Daga ..................... G06F 16/248 |
| 2009/0006946 A1* | 1/2009 | Hanson ............... G06F 17/2288 715/255 |
| 2010/0174693 A1* | 7/2010 | Chandrasekhara ......................... G06F 17/30569 707/698 |
| 2010/0228658 A1* | 9/2010 | Ketelsen ............ G06Q 30/0185 705/35 |
| 2015/0170382 A1* | 6/2015 | Bhatia ..................... G06T 11/20 345/440 |

(Continued)

Primary Examiner — Mustafa A Amin

(57) ABSTRACT

Systems and methods for presenting CRM data. Users may configure what to display on a custom report and how to arrange and display the content (e.g., size, color, theme), so that they can visualize the CRM data the way they want. A data visualization interface may be used to generate the custom report, and may use HTML to specify the CRM data to be displayed and their location on the custom report according to user configuration. The data visualization interface may use JavaScript for specifying the objects and fields users want to query to obtain the CRM data to fill up the custom report. An API may communicate with the JavaScript in the data visualization interface and then query data and objects in the CRM to get a result set. The API may be a unified API which may work across multiple platforms and query various types of database, e.g., iOS, Windows, and the browser for Salesforce online.

19 Claims, 17 Drawing Sheets

(56) References Cited

U.S. PATENT DOCUMENTS

2016/0379213 A1* 12/2016 Isaacson ............... G06Q 20/12
  705/44
2017/0235466 A1* 8/2017 Tanwir ............... G06F 3/04847
  715/738

* cited by examiner

Account Plans ▼

Newtown Memorial Hospital  ✓ Active  ✓ Approved
Regional targeting of high prescribers to maintain market share.

75% Complete

Plan Tactics (4)  View All »
1 Complete
3 Incomplete

Account Tactics (6)  View All »
30% Complete
2 Complete
4 Incomplete

Call Objectives (90)  View All »
30% Complete
20 Complete
70 Incomplete

Key Stakeholders (10)  View All »

| NAME | ROLE | OWNER |
|---|---|---|
| Ackerman, Clinton | CFO | Jones, Salina |
| Betty, Marco | Board Member | Abby, Maggie |
| Machachian, Mariah | Board Member | Franco, David |
| Blake, Adam | Medical Director | Li, Steven |

Team Members (8)  View All »

| NAME | ROLE |
|---|---|
| Jones, Salina | KAM |
| Abby, Maggie | Team Member |
| Franco, David | Executive Sponsor |
| Li, Steven | Executive Sponsor |

KOL Profile

Alexander, Richard

Position: Senior Physician
Specialty: Thoracic Oncology

Institution: Wells Medical Center
Address: 200 48th Street, Suite 1600
Sacramento, CA 92115
Phone: 1+ 855-600-0000
Email: ralexander@udmc.com

Career History »

Primary Position: Senior Physician
Institution: UC Davis Medical Center

- (8) Hospitals
- (2) Professorships
- (1) Department Head
- (3) Universities
- (5) Advisory Boards
- (4) Others

Affiliations »

23
Total Affiliations

- (8) Hospitals
- (2) Professionals
- (1) Practice
- (3) Institutions
- (5) Boards
- (4) Others

Expertise »

Stroke: ▮▮▯▯▯▯▯▯▯▯ 10

Company Collaboration »

My Company:                    Neutral ─── Strong

| Back | | | | |
|---|---|---|---|---|
| Edit... | | | | |
| Record a Call | ⊗ Antonucci, Rose | ⚇ | ⛬ ✚ | ⟲ |
| Launch Media | | Name Rose Antonucci | Gender F | |
| New Medical Inquiry | | Middle A | Credentials MD | |
| Send Email | | Suffix | Specialty Cardiology | |
| Consent Capture | | Preferred Name Dr. A | Specialty 2 General Practice | |
| New Order | | Status | Primary Parent Not Available | |
| Account Summary | | Order Type All, Transfer | Language English | |
| Custom Reports | | Default Order Type | Territory View | |
| View Hierarchy | My Account Info | | | |
| Calendar | 1107 | | | |
| Sphere of Influence | | My Target ☐ | | Route |
| Addresses (2) | | My Detailing Priority | | Day Since Last Call 14 |
| Customer Interactions (27) | | My Preferred Address 400 Route 2A Suite E | | My Last Activity Date 7/3/2017 |
| Call Samples (2) | | My Preferred Location | | My YTD Activity 29 |
| | Key Indicators | | | Allowed Product ⑦ |
| Multichannel Activities (0) | | Preferred Statin Zostatin | | Call Frequency 24 |
| Last Update: 7/17/2017, 10:33 AM | | | | |

SYSTEM AND METHOD FOR DISPLAYING DATA FROM A STORAGE

BACKGROUND

The subject technology relates generally to data processing, and more specifically to visualizing data from a data storage system.

Customer relationship management ("CRM") and other data storage systems are widely used to manage data for various type of organizations ("customer"). User interfaces of the data management systems usually have a number of fields, e.g., a field for a doctor's name, and a field for the doctor's phone number. Such user interfaces are convenient for data entry, but not convenient for users to understand and use the data. Thus, it is desirable to provide a system and method for visualizing the data so that it is easier for users to understand it.

SUMMARY

The disclosed subject matter relates to a method for displaying data from a data storage system. The method comprises: enabling generation of a data visualization interface for rendering a first custom report according to previously received user configuration. The user configuration comprises a first type of data to be displayed at a first location on the first custom report and a second type of data to be displayed at a second location on the first custom report. The first type of data and the second type of data are obtained from the data storage system. The data visualization interface comprises instructions in a markup language for specifying the first type of data, the first location, the second type of data, and the second location, and instructions in a second programing language for obtaining the first type of data and the second type of data from the data storage system. The method further comprises: receiving instructions in the second programing language from the data visualization interface at an application programming interface ("API"); sending an API call to the data storage system to obtain the first type of data and the second type of data; receiving the first type of data and the second type of data at the data visualization interface; rendering the first custom report based on the first type of data, the first location, the second type of data and the second location; displaying the first custom report; receiving new data and storing the new data in a memory device; and updating the first customer report with the new data from the memory device before the new data is saved to the data storage system.

BRIEF DESCRIPTION OF THE DRAWINGS

FIG. 8 to FIG. 13 each illustrates an example custom report according to one embodiment of the present invention.

FIG. 14 illustrates an example of a traditional CRM account screen.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Figure 1:
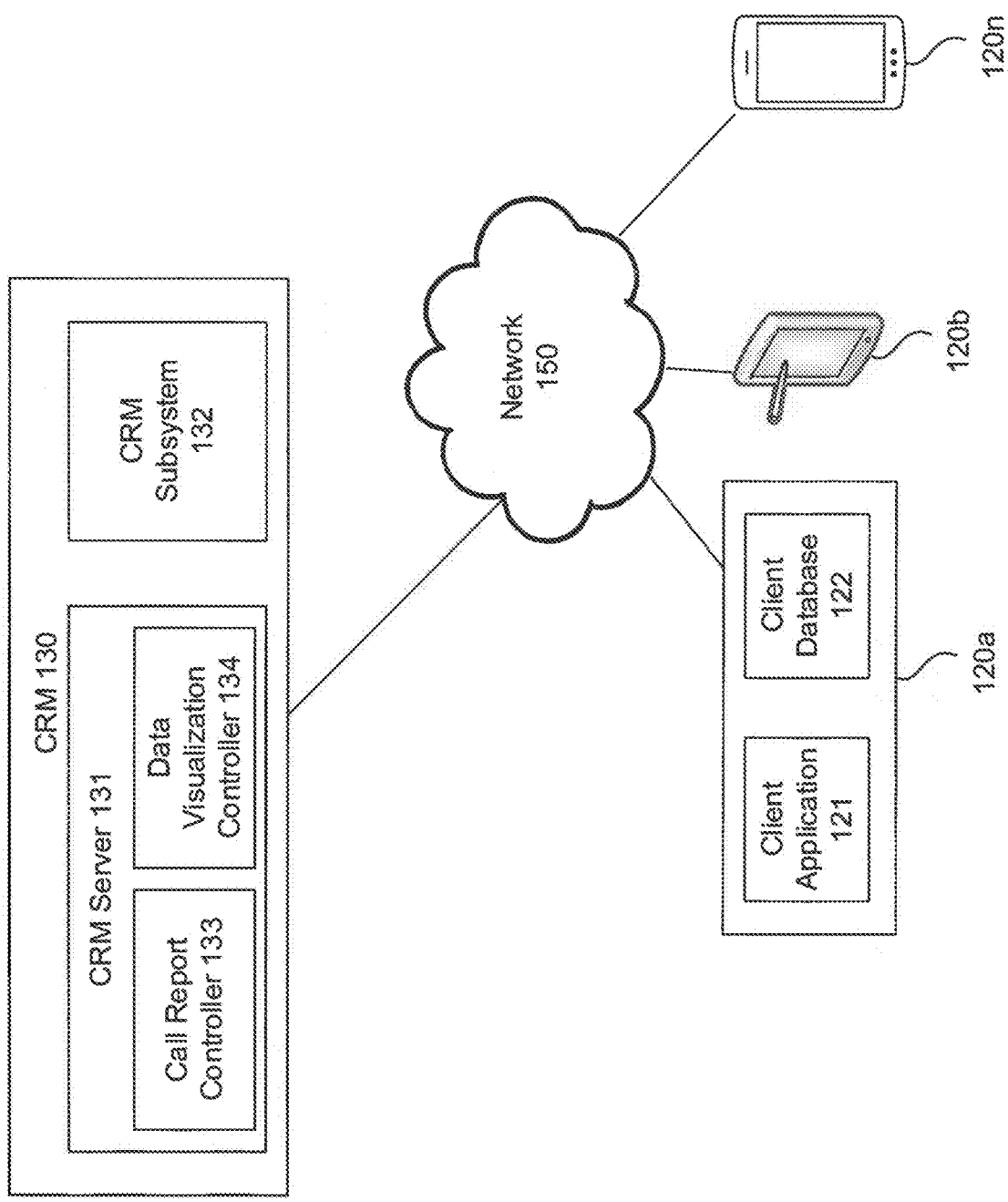
FIG. 1 illustrates an example high level block diagram of a customer relationship management architecture wherein the present invention may be implemented.

FIG. 1 illustrates an example high level block diagram of a customer relationship management architecture 100 wherein the present invention may be implemented. As shown, the architecture 100 may include a plurality of user computing devices 120a, 120b, ... 120n, and a CRM 130, coupled to each other via a network 150. The CRM 130 may include a customer relationship management server 131, and a customer relationship management subsystem 132. The customer relationship management server 131 may further include a call report controller 133 and a data visualization controller 134. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the CRM 130 via the network 150, and may be any commercially available computing devices including laptop computers, desktop computers, mobile phones, smart phones, tablet computers, netbooks, and personal digital assistants (PDAs). A CRM client application 121 may run from a user computing device, e.g., 120a, and access the CRM 130 via the network 150. A client database 122 for the client application 121 may store a subset of data from the database system 110 which may be needed to support the operation of the client application 121. The client database 122 may be synchronized with the database system 130 regularly, when the user computing device is back online, and/or when the user requests for synchronization. User computing devices 120a-120n are illustrated in more detail in FIG. 3.

The customer relationship management server 131 is typically a remote computer system accessible over a remote or local network, such as the network 150, and may provide access to the customer relationship management subsystem 132. The customer relationship management server 131 could be any commercially available computing devices. A client application (e.g., 121) process may be active on one or more user computing devices 120a-120n. The corresponding server process may be active on the customer relationship management server 131. The client application process and the corresponding server process may communicate with each other over the network 150, thus providing distributed functionality and allowing multiple client applications to take advantage of the information-gathering capabilities of the CRM 130.

Figure 5:
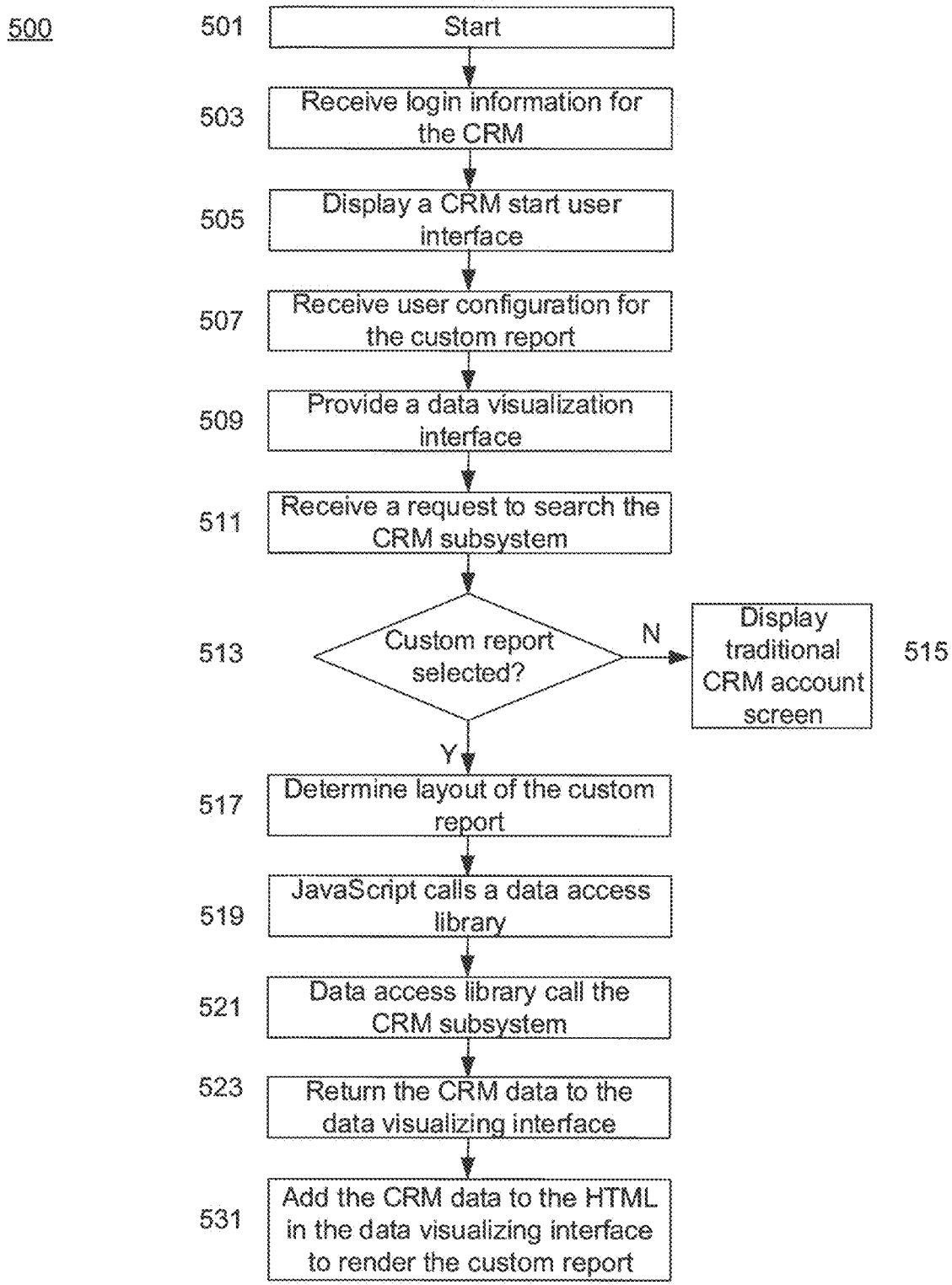
FIG. 5 illustrates an example flowchart of a method for displaying data from a data storage system according to one embodiment of the present invention.

In one implementation, the call report controller 133 in the customer relationship management server 131 may control the process for generating a call report, e.g., for recording the interactions between a sales representative of a pharmaceutical company and a doctor, and the data visualization controller 134 in the customer relationship management server 131 may control the process for visualizing data from the customer relationship management subsystem 132, as will be described with reference to FIG. 5 below.

Although the call report controller 133 and the data visualization controller 134 are shown in one server, it should be understood that they may be implemented in multiple servers.

In one implementation, the customer relationship management subsystem 132 stores contact information that may be available to users. In addition to contact information, the customer relationship management subsystem 132 can also store configurations regarding specific preferences, regulatory limitations and requirements, sales data and other fields that will facilitate communications, in general or on a by-recipient basis.

In one implementation, the customer relationship management subsystem 132 can communicate with multiple sources through the customer relationship management server 131 or through other channels to maintain a current and accurate collection of information regarding customer accounts, which may include group accounts and individual accounts. The interface with the multiple sources can be, for example, through an Application Programming Interface or API, as the API interface will allow compatibility with a flexible array of third-party provider servers. The information being updated may include, but is not limited to, licensing information, area of practice, and location of the various customer accounts. In this manner, the customer relationship management subsystem 132 pulls the approved version of what represents an account, which may be a hospital or physician, and pulls from multiple networks to ensure that the information regarding an account is up-to-date.

In one implementation, the customer relationship management subsystem 132 may be operated by a third party.

In one implementation, the CRM 130 may be a multi-tenant system where various elements of hardware and software may be shared by one or more customers. For instance, a server may simultaneously process requests from a plurality of customers. In a multi-tenant system, a user is typically associated with a particular customer. In one example, a user could be an employee of one of a number of pharmaceutical companies which are tenants, or customers, of the CRM 130.

Although the embodiments are described with a customer relationship management subsystem 132, the customer information and content may be from other types of information management systems, e.g., a Closed Loop Marketing (CLM) system. Other types of data storage systems may be used as well.

In one embodiment, the CRM 130 may run on a cloud computing platform. Users can access content on the cloud independently by using a virtual machine image, or purchasing access to a service maintained by a cloud database provider. The customer relationship management subsystem 132 may be a cloud-based customer database that provides a central access to store and distribute consistent data across customer companies as well as their possible third-party partners and agencies that are used to keep this data updated. This system can provide standard data formats and provide an easy and automated way for customers to have access to coordinated and frequently updated CRM data.

In one embodiment, the CRM 130 may be provided as Software as a Service ("SaaS") to allow users to access it with a thin client.

Figure 2:
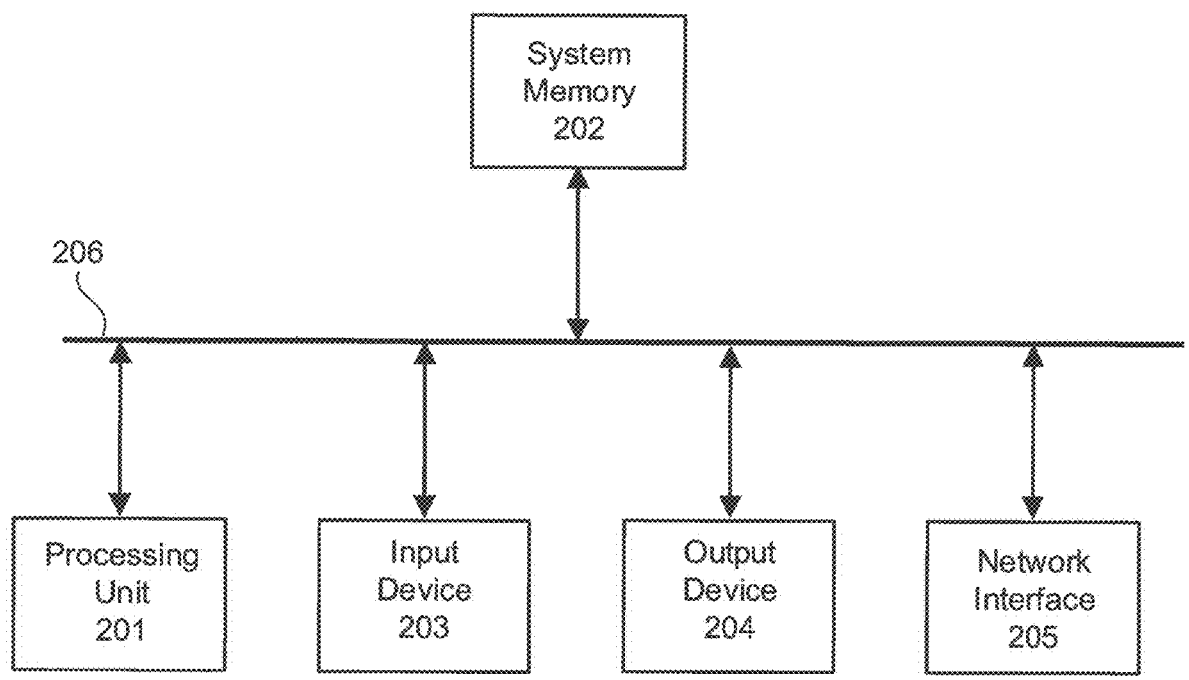
FIG. 2 illustrates an example block diagram of a computing device.

FIG. 2 illustrates an example block diagram of a computing device 200 which can be used as the user computing devices 120a-120n, and the customer management relationship server 131 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 204 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
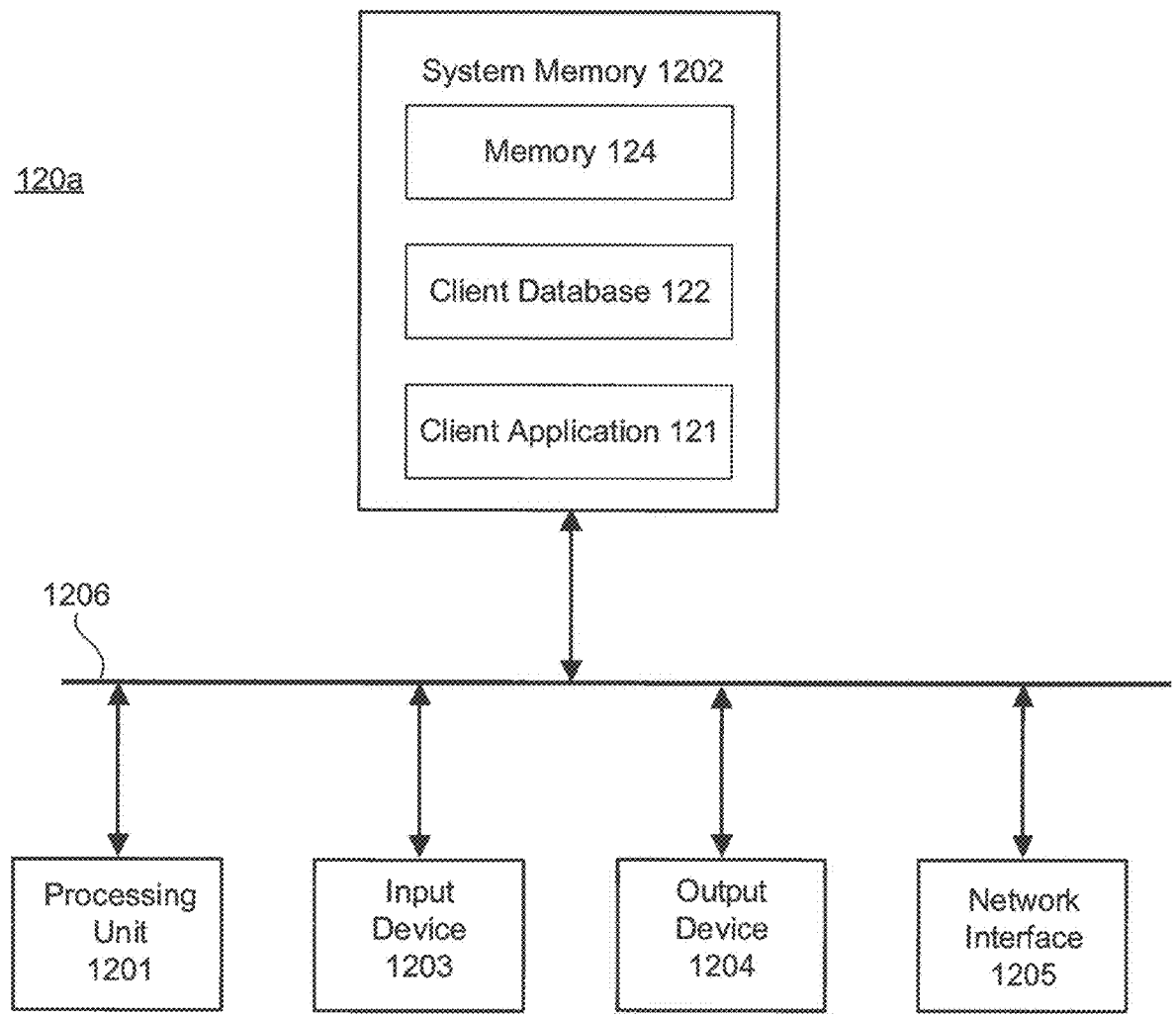
FIG. 3 illustrates an example high level block diagram of a user computing device.

FIG. 3 illustrates an example high level block diagram of a user computing device (e.g., 120a) wherein the present invention may be implemented. The user computing device 120a may be implemented by the computing device 200 described above, and may have a processing unit 1201, a system memory 1202, an input device 1203, an output device 1204, and a network interface 1205, coupled to each other via a system bus 1206. The client application 121 and the client database 122 may be stored in the system memory

1202. In one embodiment, the client database 122 may be maintained in a local store, e.g., a hard disk, relational store, cache memory, etc. The client application 121 may have a client data visualization controller 123 and the system memory 1202 may include a memory 124 for temporally storing new data. The client database may be a subset of data in the CRM subsystem 132 that the user is authorized to access.

Figure 4:
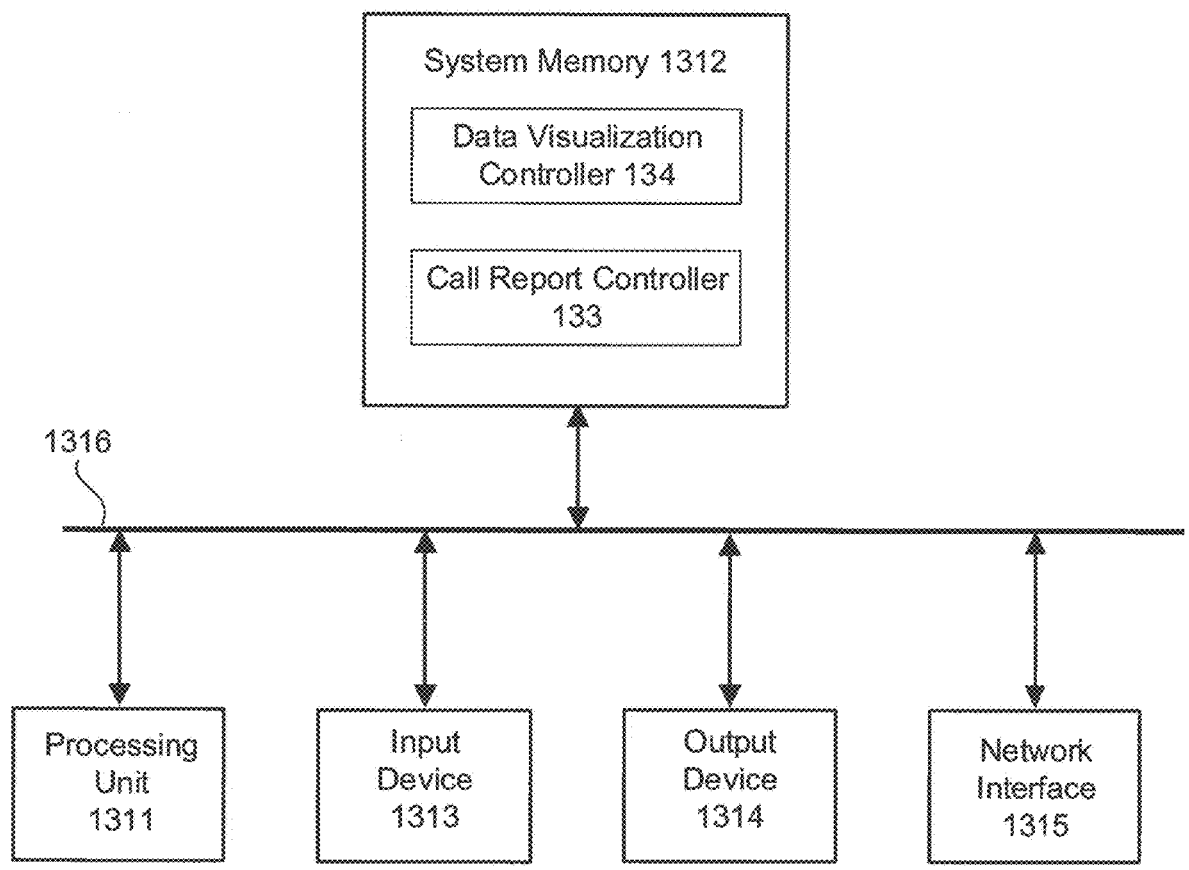
FIG. 4 illustrates an example high level block diagram of the customer relationship management server according to one embodiment of the present invention.

FIG. 4 illustrates an example high level block diagram of the customer relationship management server 131 according to one embodiment of the present invention. The customer relationship management server 131 may be implemented by the computing device 200, and may have a processing unit 1311, a system memory 1312, an input device 1313, an output device 1314, and a network interface 1315, coupled to each other via a system bus 1316. The system memory 1312 may store the call report controller 133 and the data visualization controller 134.

The present invention allows users to configure what to display on a custom report and how to arrange and display the content (e.g., size, color, theme) on the custom report, so that they can visualize the CRM data the way they want. A data visualization interface may be used to generate the custom report, and may have code in a markup language for describing and defining the content of the custom report. One example of the markup language is HyperText Markup Language ("HTML"), and the HTML code may specify the CRM data to be displayed and their location on the custom report according to user configuration. The data visualization interface may also have code in a programing language for describing the custom report's functionality, which may be, e.g., JavaScript code for specifying the objects and fields users want to query to obtain the CRM data to fill up the custom report. The CRM data is returned to the data visualization interface in JSON format. The JavaScript code may place the CRM data at the right place on the custom report, using the HTML to display the custom report.

Users may modify the objects and fields they like to query using the JavaScript. The data visualization interface could be a webpage, iFrame, or Webview.

The present invention provides an application programing interface ("API") which may communicate with the JavaScript in the data visualization interface and then query data and objects in the CRM subsystem 132 to get a result set.

In one implementation, the API may be a unified API which may query various types of data sources across multiple platforms, e.g., IOS™, WINDOWS™, and the browser for SALESFORCE™ online. What a user frequently queries (e.g., the last five calls, most recent calls or all calls submitted) may be packaged up in well formed API calls. The JavaScript may communicate with the API only, and does not have to care about the type of the actual database to be queried.

FIG. 5 illustrates an example flowchart of a method for visualizing data from a CRM system according to one embodiment of the present invention. The process may start at 501.

At 503, a user may login to the CRM 130.

At 505, a start user interface for the CRM 130 may be displayed in response, by the CRM server 131.

Figure 8:
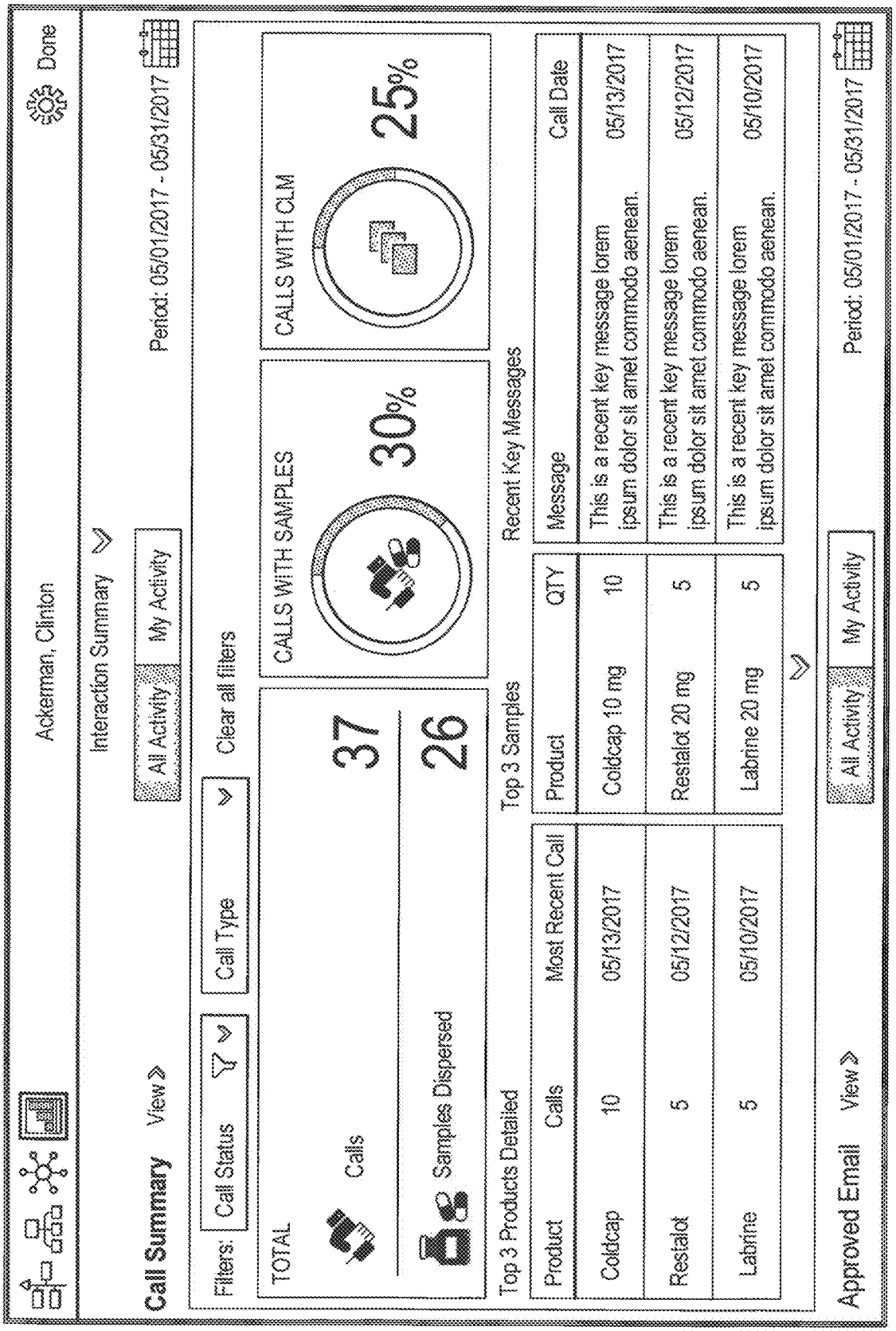
Figure 9A:
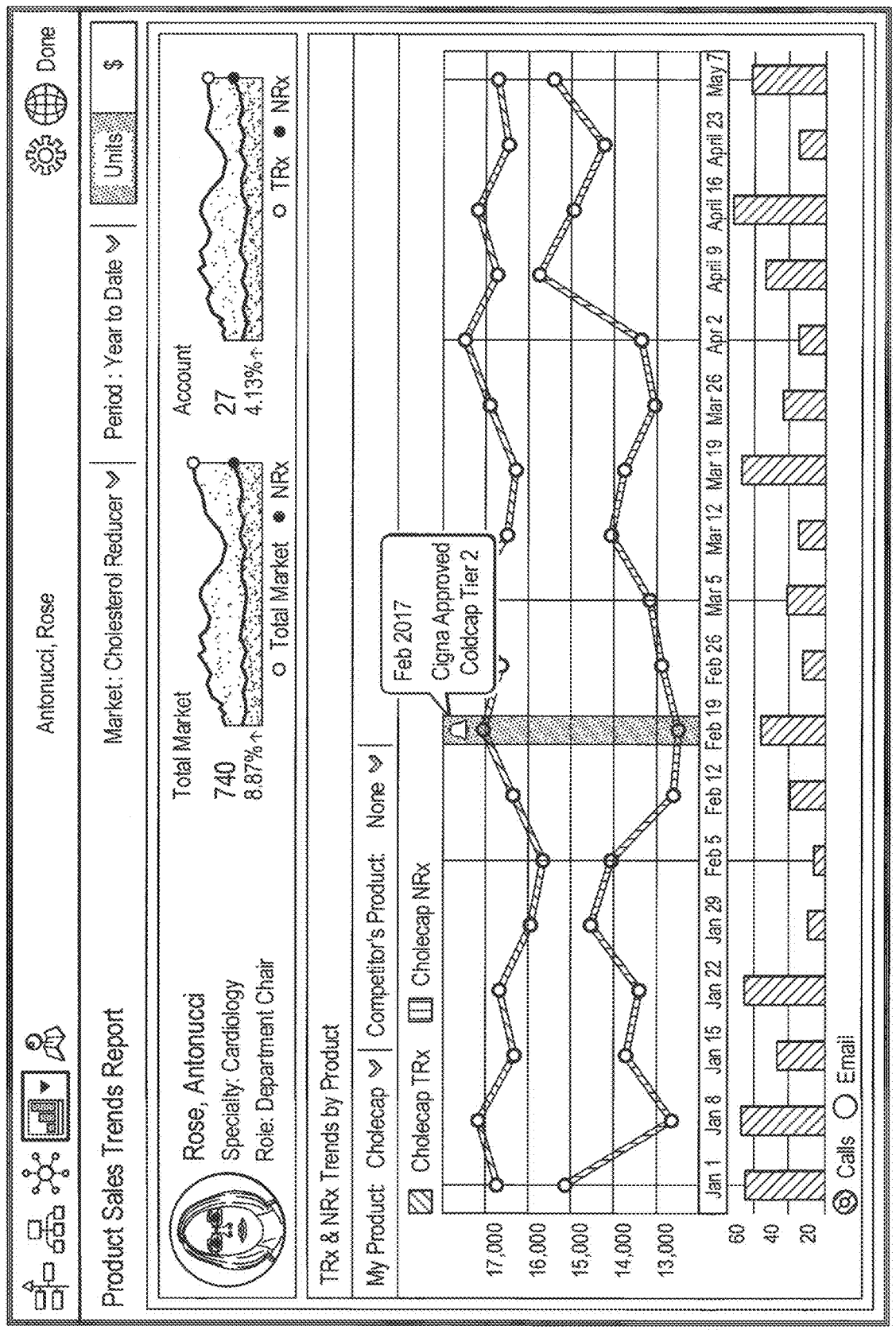
Figure 9B:
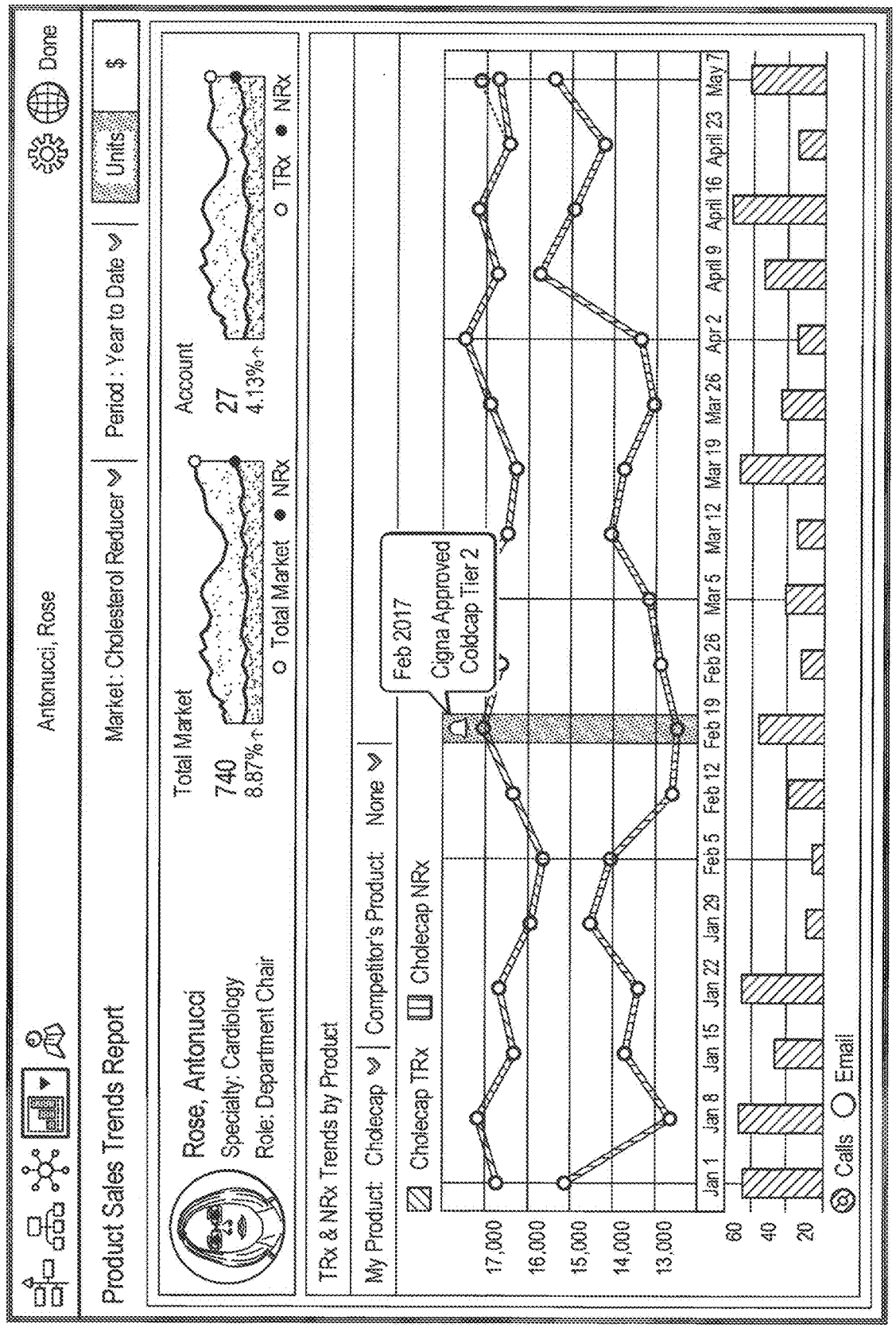
Figure 10:
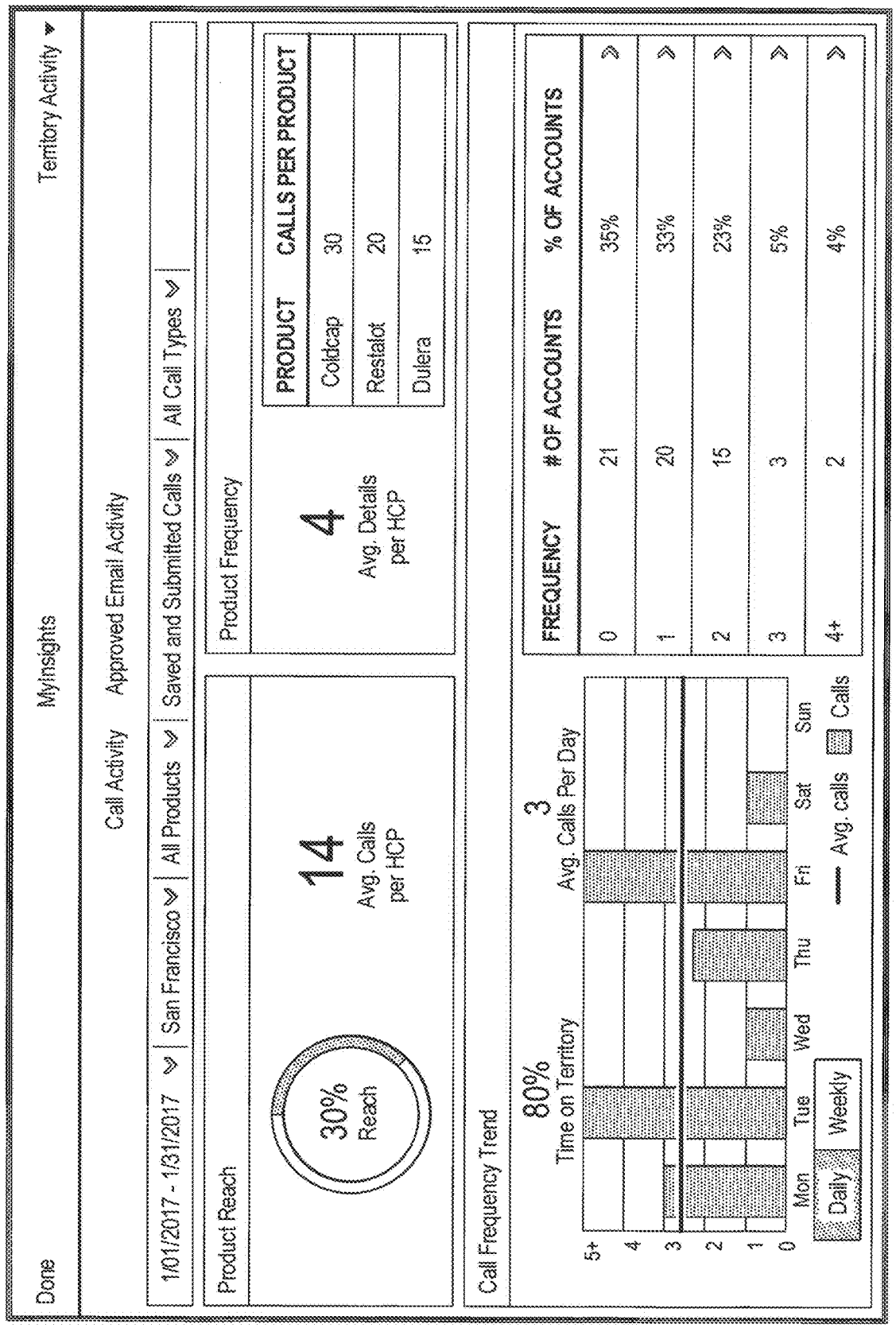
Figure 13:
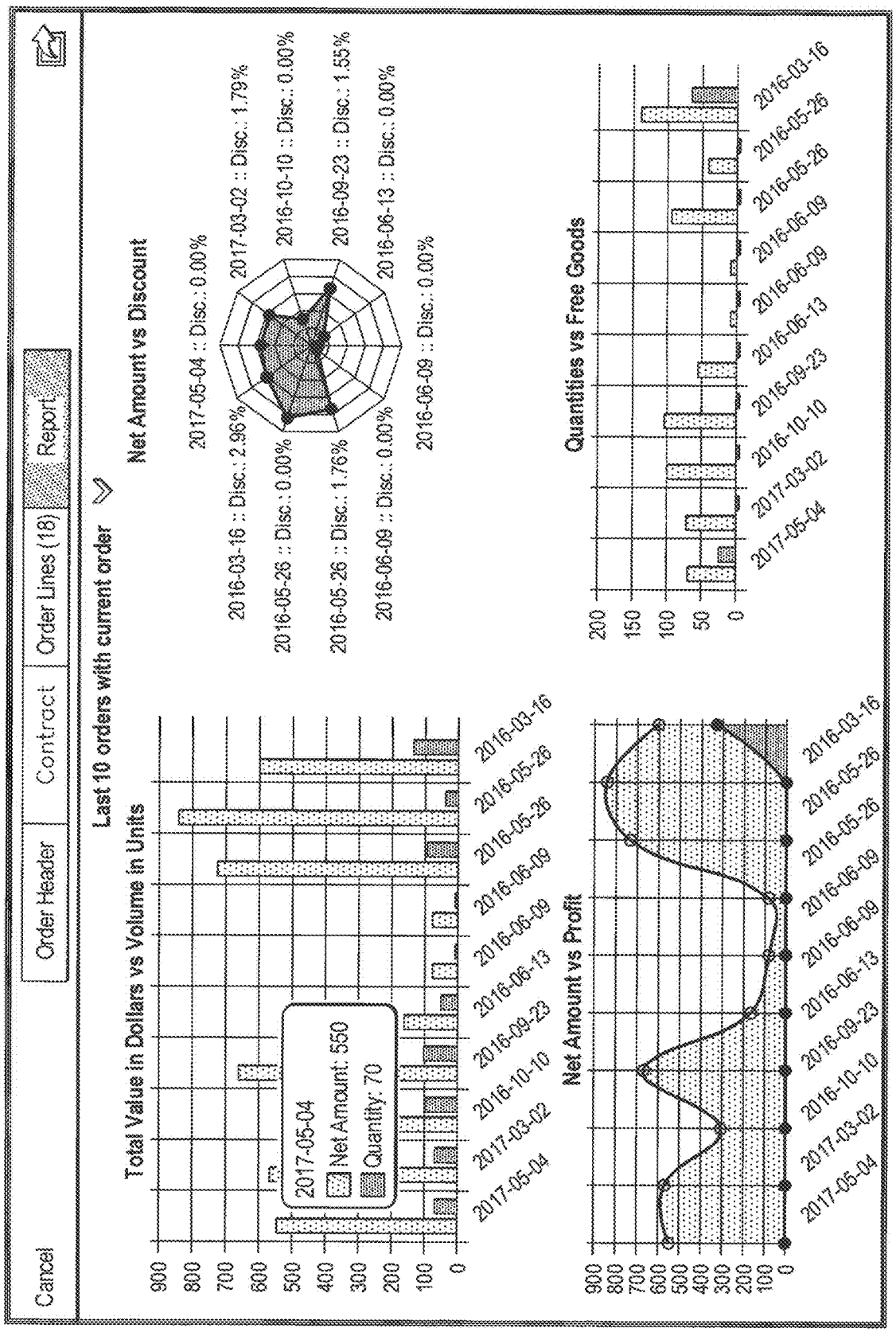

At 507, the user may configure the layout of a custom report. In one implementation, a number of layouts may be displayed by the data visualization controller 134 so that the user can select. Each of the layouts may include a selected set of data fields (e.g., a doctor's name, contact information, and license information), display the data in various formats (e.g., a pie chart, bar chart, donut chart, histogram, line chart, or scatter plot), and arrange the data in various patterns on the user interface. FIGS. 8 to 13 illustrate examples of the custom reports. Specifically, FIG. 8 illustrates an example of a user's call summary, which shows information about calls and samples. FIG. 9 illustrates an example of a product sales trend report, which shows a doctor's name, picture, specialty and product sales trend. FIG. 10 illustrates an example of a user's activity report, including call activities and email activities. FIG. 11 illustrates an example of an account plan, which shows a user's plan tactics, account tactics, and call objectives. FIG. 12 illustrates an example of a KOL profile. FIG. 13 illustrates an example of an order report.

At 509, a data visualization interface may be provided to generate the custom report according to the user configuration of the custom report layout. The data visualization interface may have HTML for specifying the CRM data to be displayed on the custom report and their location on the custom report according to the user configuration.

The data visualization interface may also have embedded JavaScript for specifying the objects and fields users want to query to obtain the CRM data from the customer management relationship subsystem 132 to fill up the custom report.

In one implementation, a number of templates of the data visualization interface may be provided as out of the box options, and the user may customize the templates by editing the HTML.

In one implementation, instead of selecting an out of the box template, the user may build a template himself/herself. The user may take a blank HTML file and write their own HTML. The user may also select methods from a data access library, e.g., the data access library 603 described below, to build their own template of the data visualization interface.

In one implementation, a user interface may be displayed by the data visualization controller 134 for the user to customize the custom report. A number of windows may be displayed for the user to select the type of data to be displayed on the custom report, and the location, format and pattern that the data will be displayed.

In one implementation, the data visualization interface may be a webpage. In one implementation, the data visualization interface may be an iFrame. In one implementation, the data visualization interface may be a Webview.

At 511, the user may search the CRM subsystem 132 for data related to a doctor, e.g., Dr. John Smith. The search result may be returned, e.g., by the CRM server 131.

At 513, it may be determined if the user has selected the custom report, e.g., by the data visualization controller 134. In one implementation, the user may set the custom report as the default view.

If not, at 515, a traditional CRM account screen 1400 with a number of data fields, as shown in FIG. 14, may be displayed by the CRM server 131.

If the user has selected the custom report, at 517, the layout of the custom report may be determined for the user. If the user has not selected a custom report layout, a default layout may be used. The custom report may be used to visualize part or all data on the account record in the style the user selected or the default layout configured. It may also visualize data on related objects. Instead of a list of records, the custom report may have areas to display account details, a photo of the doctor, chart of basic activities (e.g., if they call or email, and the last week of sales). When these areas are filled, the custom report may help the user to understand who the doctor is and his/her activities, as shown in FIGS.

8 to 13. Rather than a data entry heavy CRM account screen, the custom report may be an account level report, or a sales dashboard.

In one implementation, the JavaScript embedded in the data visualization interface may query the CRM subsystem 132 through an application programing interface ("API").

In one implementation, the user may select methods to use from the data access library to interact with the API.

When there is a child application, one application that lives within another installed application, the child application usually communicates through the API provided by the parent application to a data source inside the parent application or external to and exposed through the parent application. Should this child application live within multiple parent applications that provide potentially distinct APIs, the child application would contain multiple pathways through the logic in the application to accommodate these differences in the parent application APIs.

The data visualization of the present invention may facilitate the creation of custom content for data from various platforms, e.g., IOS™, WINDOWS™, and the browser for SALESFORCE™ online. The data visualization controller 134 of the present invention may be integrated as a portion of IOS™, WINDOWS™, Mobile, or SALESFORCE™ web applications, and live as a child application within these parent applications. In order to make convenient use of the CRM data, whether it is available through network calls or locally within the parent application, the data access library may expose an API for interacting with the CRM data.

In one implementation, the CRM subsystem 132 may use the Salesforce™ CRM. The two distinct data sources, local SALESFORCE™ data sources and the SALESFORCE™ online application data sources, require two different implementations to accomplish the same end effect—a unified API used to communicate with different parent applications. The "online" implementation is the implementation that lives within the SALESFORCE™ online web application. The "offline" implementation is the implementation that lives within a native app such as an IOS™ application or a WINDOWS™ Mobile application.

Figure 6:
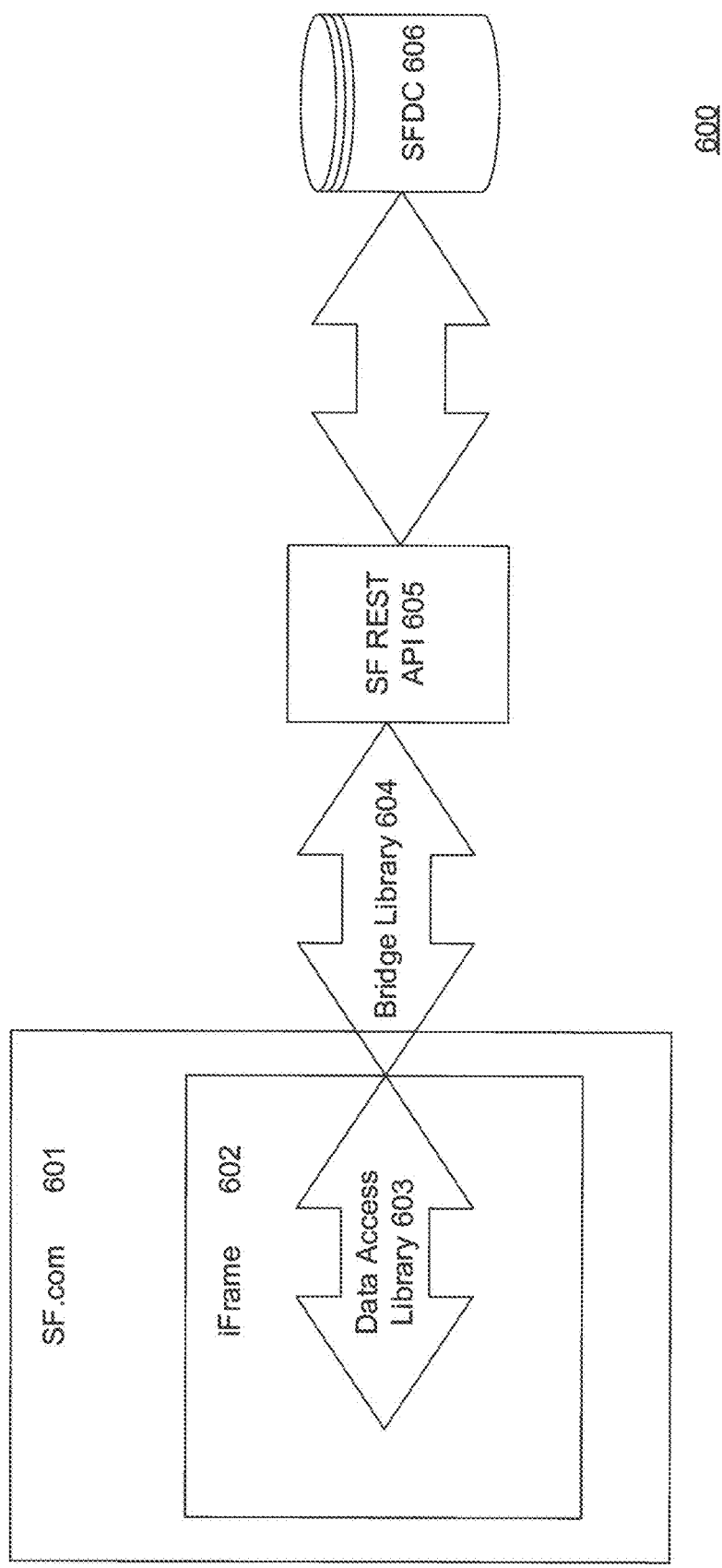
FIG. 6 illustrates an example application programming interface ("API") according to one embodiment of the present invention.

For the online implementation, as shown in FIG. 6, the communication pathway from the data visualization interface code (e.g., the JavaScript code in the data visualizing interface) to the CRM subsystem 606 may incorporate three libraries. The JavaScript code may first make calls to the data access library 603 at 519. These calls are the exact same calls they would make when the report is running inside of a CRM native iOS or Windows application.

After the JavaScript code makes a call to the data access library 603, at 521, the data access library 603 may query objects and fields in the CRM subsystem 132, starting with posting a message from within the iFrame where the report is rendered, to the parent page via the window.postMessage() function provided by the web browser vendor. The Bridge Library 604 instantiated within the customized Salesforce page is subscribed to and listening for these messages. When the Bridge Library 604 receives a message from the data access library 603, the corresponding and appropriate functions are called within the Salesforce Force library, which is incorporated in the Bridge Library files, to return the data requested by the JavaScript code through queries to the SALESFORCE™ REST API 605. The Bridge Library 604 normalizes the data returned from the SALESFORCE™ API 605 in order to give it the same shape as the data that would be returned in the Offline Implementation. At 523, the data requested by the Javascript code may be returned to the data visualization interface from the CRM subsystem 132.

Figure 7:
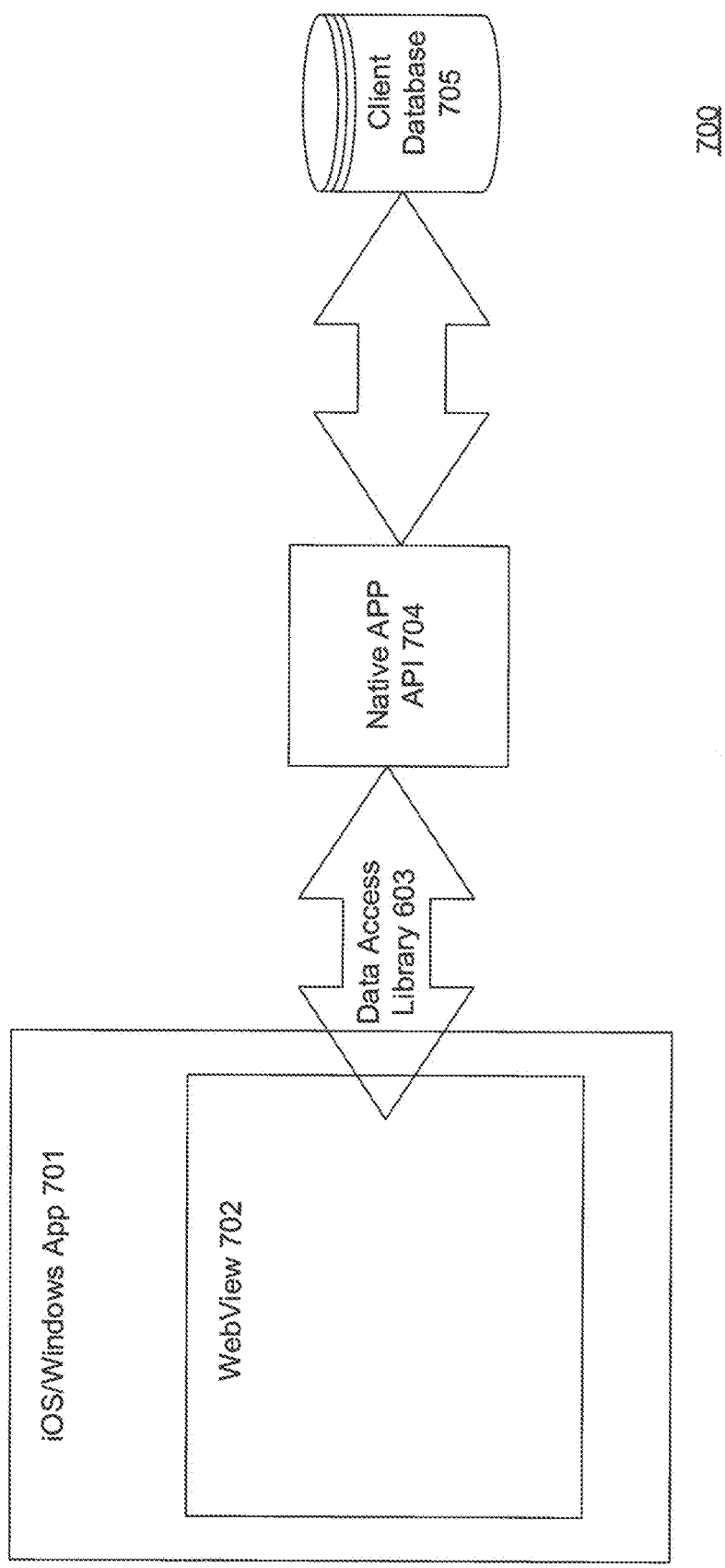
FIG. 7 illustrates an example API according to one embodiment of the present invention.

For the offline implementation, as shown in FIG. 7, the custom report within the native application, is rendered within a Webview 702. This is a web browser within the native application. In order for the report within the Webview to communicate with the parent application, a unique use of the url/location of the Webview 702 has been devised where strings with a certain signature posted to the location of the Webview 702 are captured while the navigation of the Webview 702 is cancelled. That string contains commands and queries that can run against the local data source. This cycle of posting strings to the location of the Webview 702 and the native application posting the data back to the Webview 702 are completed by using unique callbacks for each query. This cycle of queries and callbacks is facilitated by the data access library 603. Calls and returns are normalized to be the same as the calls and returns in the Online implementation.

The data access library 603 is a unified API which may be used to communicate with a parent application, whether the device is in an offline state (disconnected from the internet) or online state (connected to the internet), from within the parent application—the parent application being an application installed on a device or an application running within a web browser.

In one implementation, the CRM data may be returned to the data visualization interface in JSON format.

At 531, the JavaScript code may place the CRM data at the right place on the custom report, using the HTML to render the custom report.

Figure 15A:
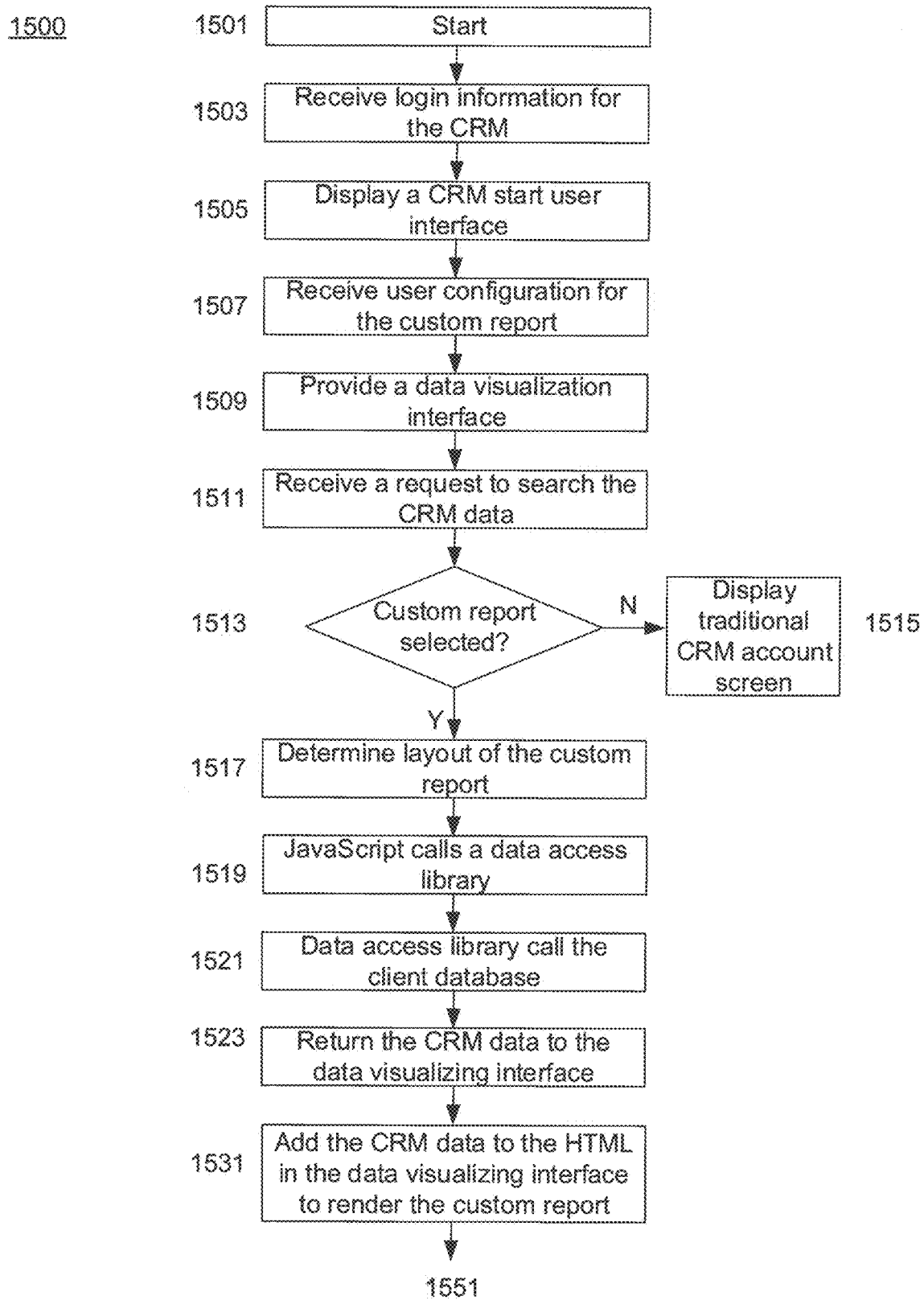
FIGS. 15A and 15B illustrate an example flowchart of a method for displaying data from a data storage system according to one embodiment of the present invention.
Figure 15B:
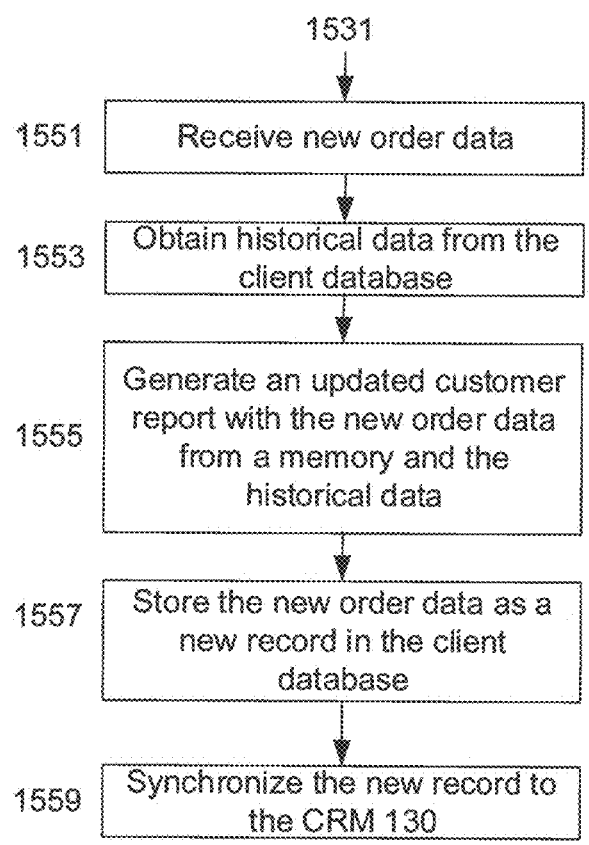

In one embodiment, the customer report may be updated with new data before the data is stored in the CRM 130 and persisted. FIGS. 15A and 15B illustrate an example flowchart of a method for visualizing live data update to a CRM system according to one embodiment of the present invention. The process may be carried out on a user computing device even when connection to the network 150 is unavailable. In one example, during a new order capture, a user (e.g., a sales representative) may enter data for this new order before its close to see how the new order can impact the product sales trend. The new order is not stored in the CRM 130, or the client database 122 when the network 150 is unavailable, and persisted yet.

At 1503, a user may login to the client application 121 when the network 150 is unavailable, or the CRM 130.

At 1505, a start user interface for the CRM 130 may be displayed in response, by the client application 121.

At 1507, the user may configure the layout of a custom report. In one implementation, a number of layouts may be displayed by a client data visualization controller 123 in the client application 121 so that the user can select. Each of the layouts may include a selected set of data fields (e.g., a doctor's name, contact information, and license information), display the data in various formats (e.g., a pie chart, bar chart, donut chart, histogram, line chart, or scatter plot), and arrange the data in various patterns on the user interface, as shown in FIGS. 8 to 13.

At 1509, a data visualization interface may be provided by the client data visualization controller 123 to generate the custom report according to the user configuration of the custom report layout. The data visualization interface may have HTML for specifying the CRM data to be displayed on the custom report and their location on the custom report according to the user configuration.

The data visualization interface may also have embedded JavaScript for specifying the objects and fields users want to query to obtain the CRM data from the CRM subsystem 132 or the client database 122 to fill up the custom report.

In one implementation, a number of templates of the data visualization interface may be provided as out of the box options, and the user may customize the templates by editing the HTML.

In one implementation, instead of selecting an out of the box template, the user may build a template himself/herself. The user may take a blank HTML file and write their own HTML. The user may also select methods from a data access library, e.g., the data access library 603, to build their own template of the data visualization interface.

In one implementation, a user interface may be displayed by the client data visualization controller 123 for the user to customize the custom report. A number of windows may be displayed for the user to select the type of data to be displayed on the custom report, and the location, format and pattern that the data will be displayed.

In one implementation, the data visualization interface may be a webpage. In one implementation, the data visualization interface may be an iFrame. In one implementation, the data visualization interface may be a Webview.

At 1511, the user may search the CRM data related to the product sales trend, and the CRM data could be from the CRM subsystem 132, or the client database 122 when the network 150 is unavailable. The search result may be returned, e.g., by the client data visualization controller 123.

At 1513, it may be determined if the user has selected the custom report, e.g., by the client data visualization controller 123. In one implementation, the user may set the custom report as the default view.

If not, at 1515, a traditional CRM account screen 1400 with a number of data fields, as shown in FIG. 14, may be displayed by the client application 121.

If the user has selected the custom report, at 1517, the layout of the custom report may be determined for the user. If the user has not selected a custom report layout, a default layout may be used. The custom report may be used to visualize part or all data related to the product sales trend in the style the user selected or the default layout configured. It may also visualize data on related objects. Instead of a list of records, the custom report may have areas to display bars charts or waveforms to show the product sales trend, as shown in FIG. 9. When these areas are filled, the custom report may help the user to understand the product sales trend. Rather than a data entry heavy CRM account screen, the custom report may be a sales dashboard.

In one implementation, the JavaScript embedded in the data visualization interface may query the CRM data, e.g., in CRM subsystem 132 or client database 122, through a data access library 603 application programing interface ("API") at 1519.

In one implementation, the user may select methods to use from the data access library to interact with the API.

When there is a child application, one application that lives within another installed application, the child application usually communicates through the API provided by the parent application to a data source inside the parent application or external to and exposed through the parent application. Should this child application live within multiple parent applications that provide potentially distinct APIs, the child application would contain multiple pathways through the logic in the application to accommodate these differences in the parent application APIs.

The data visualization of the present invention may facilitate the creation of custom content for data from various platforms, e.g., iOS, Windows, and the browser for Salesforce online. The client data visualization controller 123 of the present invention may be integrated as a portion of iOS, Windows Mobile, or Salesforce web applications, and live as a child application within these parent applications. In order to make convenient use of the CRM data, whether it is available through network calls or locally within the parent application, the data access library may expose an API for interacting with the CRM data.

In one implementation, the CRM subsystem 132 may use the Salesforce™ CRM. The two distinct data sources, the client database 122 and the Salesforce online application data sources, require two different implementations to accomplish the same end effect—a unified API used to communicate with different parent applications. The "online" implementation is the implementation that lives within the Salesforce online web application. The "offline" implementation is the implementation that lives within a native app such as an iOS application or a Windows Mobile application.

For the offline implementation, as shown in FIG. 7, the custom report within the native application, is rendered within a Webview 702. This is a web browser within the native application. In order for the report within the Webview to communicate with the parent application, a unique use of the url/location of the Webview 702 has been devised where strings with a certain signature posted to the location of the Webview 702 are captured while the navigation of the Webview 702 is cancelled. That string contains commands and queries that can run against the local data source. This cycle of posting strings to the location of the Webview 702 and the native application posting the data back to the Webview 702 are completed by using unique callbacks for each query. This cycle of queries and callbacks is facilitated by the data access library 603 at 1521. Calls and returns are normalized to be the same as the calls and returns in the Online implementation.

The data access library 603 is a unified API which may be used to communicate with a parent application, whether the device is in an offline state (disconnected from the internet) or online state (connected to the internet), from within the parent application—the parent application being an application installed on a device or an application running within a web browser.

In one implementation, the CRM data may be returned to the data visualization interface at 1523, e.g., in JSON format.

At 1531, the JavaScript code may place the CRM data at the right place on the custom report, using the HTML to render the custom report.

At 1551, new order data may be received at a user computing device, e.g., 120*a*. The new order data may be stored in a memory, e.g., memory 124, which may be a volatile memory, in the user computing device before the workflow for creating a new order is completed.

At 1553, corresponding historical data may be obtained as a benchmark. The historical data may be obtained from the online persisted database CRM subsystem 132 when it is accessible by the server process, or the offline persisted client database 122 by the client application 121.

At 1555, an updated customer report reflecting the new order data from the memory 124 in the user computing device may be generated and displayed. In one implementation, the updated customer report may be displayed in a separate window, and the user may switch between the historical customer report and the updated customer report. In one implementation, the updated customer report may be displayed over the historical customer report, as shown in FIG. 9B, so that the user can compare the product sales trend before and after the new deal.

If the user is happy with the new order, he may complete the workflow for creating a new order, and the record may be stored in the client database 122 at 1557.

At 1559, the new order data may be synchronized to the CRM subsystem 132.

Thus, user can see real time update before the new order data is stored in the CRM subsystem 132, even when the user computing device is offline.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for displaying data from a data storage system, the method comprising:

enabling generation of a data visualization interface for rendering a first custom report according to previously received user configuration, wherein the user configuration comprises a first type of data to be displayed at a first location on the first custom report and a second type of data to be displayed at a second location on the first custom report; wherein the first type of data and the second type of data are obtained from the data storage system; wherein the data visualization interface comprises instructions in a markup language for specifying the first type of data, the first location, the second type of data, and the second location, and instructions in a second programing language for obtaining the first type of data and the second type of data from the data storage system, and wherein the data visualization interface does not display the first type of data, or the second type of data;

receiving the instructions in the second programing language from the data visualization interface at an application programming interface ("API");

sending an API call to the data storage system to obtain the first type of data and the second type of data;

receiving the first type of data and the second type of data at the data visualization interface;

rendering the first custom report, wherein the first custom report is based on the first type of data, the first location, the second type of data and the second location in the user configuration;

displaying the first custom report on a user interface separate from the data visualization interface;

receiving new data and storing the new data in a memory device;

updating the first customer report rendered by the data visualization interface with the new data from the memory device;

receiving an input for accepting the new data to the data storage system; and saving the new data to the data storage system in response to the input.

2. The method of claim 1, wherein the makeup language is HyperText Markup Language ("HTML").

3. The method of claim 1, wherein the second programming language is JavaScript.

4. The method of claim 3, further comprising: putting the first type of data at the first location and the second type of data at the second location with the JavaScript.

5. The method of claim 1, wherein the API is a unified API which can access a first type of data storage system and a second type of data storage system.

6. The method of claim 5, wherein the first type of data storage system is based on a first customer relationship management ("CRM") system.

7. The method of claim 6, wherein the second type of data storage system is a database based on a first operating system.

8. The method of claim 6, wherein the second type of data storage system is a database based on a second operating system.

9. The method of claim 5, wherein the first type of data storage system is an online data source.

10. The method of claim 5, wherein the first type of data storage system is an offline local data source.

11. The method of claim 5, wherein the second type of data storage system is a local data source.

12. The method of claim 1, wherein the user configuration comprises: displaying the first type of data as a picture, a pie chart, bar chart, donut chart, histogram, line chart, or scatter plot.

13. The method of claim 1, wherein the user configuration comprises: displaying the first type of data in a first color.

14. The method of claim 1, wherein the data visualization interface is a webpage.

15. The method of claim 1, wherein the data visualization interface is an iFrame.

16. The method of claim 1, wherein the data visualization interface is a Webview.

17. The method of claim 3, further comprising: making calls to a data access library in the API by the JavaScript.

18. The method of claim 17, further comprising: querying objects and fields in the data storage system by the data access library, wherein a same call from the data access library can query both an online data source and a local data source.

19. The method of claim 18, wherein the API further comprises a bridge library for receiving a message from the data access library, and querying the data storage system for the data requested by the JavaScript.

* * * * *